(12) United States Patent
Crawford et al.

(10) Patent No.: US 9,940,549 B2
(45) Date of Patent: Apr. 10, 2018

(54) METHOD FOR BLACK ICE DETECTION AND PREDICTION

(71) Applicant: INTERNATIONAL BUSINESS MACHINES CORPORATION, Armonk, NY (US)

(72) Inventors: Catherine H. Crawford, Carmel, NY (US); Shahrokh Daijavad, Morgan Hill, CA (US); John A. Gunnels, Yorktown Heights, NY (US); Tomasz Nowicki, Fort Montgomery, NY (US); Grzegorz M. Swirszcz, Ossining, NY (US); Jimi Xenidis, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 15/196,935

(22) Filed: Jun. 29, 2016

(65) Prior Publication Data

US 2018/0005084 A1    Jan. 4, 2018

(51) Int. Cl.
| G06K 9/62 | (2006.01) |
| G07C 5/08 | (2006.01) |
| G07C 5/00 | (2006.01) |
| G08G 1/0967 | (2006.01) |
| G01W 1/02 | (2006.01) |
| G01W 1/10 | (2006.01) |
| G06K 9/00 | (2006.01) |

(52) U.S. Cl.
CPC ............ *G06K 9/6267* (2013.01); *G01W 1/02* (2013.01); *G01W 1/10* (2013.01); *G06K 9/00791* (2013.01); *G06K 9/6256* (2013.01); *G07C 5/008* (2013.01); *G07C 5/0808* (2013.01); *G07C 5/0816* (2013.01); *G08G 1/096791* (2013.01)

(58) Field of Classification Search
None
See application file for complete search history.

(56) References Cited

U.S. PATENT DOCUMENTS

| 8,766,817 | B2 | 7/2014 | Sri-Jayantha | |
| 9,679,487 | B1 * | 6/2017 | Hayward | G08G 1/166 |
| 2005/0187714 | A1 * | 8/2005 | Brulle-Drews | G01C 21/26 |
| | | | | 702/3 |
| 2008/0129541 | A1 * | 6/2008 | Lu | G06K 9/00791 |
| | | | | 340/905 |
| 2010/0004862 | A1 * | 1/2010 | Gentles | G01W 1/06 |
| | | | | 702/3 |
| 2010/0004863 | A1 * | 1/2010 | Ladow | G01W 1/02 |
| | | | | 702/3 |

(Continued)

*Primary Examiner* — Delomia L Gilliard
(74) *Attorney, Agent, or Firm* — F. Chau & Associates, LLC (57) ABSTRACT

A method of black ice detection includes receiving image stream data from a mobile device. The mobile device is in a vehicle. At least one of accelerometer data from at least one accelerometer, temperature and humidity data, and on board dash vehicle data is received. A classifier embedded in the mobile device is run to evaluate the received image stream data, and the at least one of the accelerometer data, the temperature and humidity data, and the on board dash vehicle data. It is determined whether black ice is present in the image stream data based on a result generated by the classifier.

18 Claims, 8 Drawing Sheets

(56) References Cited

U.S. PATENT DOCUMENTS

| | | | |
|---|---|---|---|
| 2012/0229302 A1* | 9/2012 | Sri-Jayantha | G08G 1/0112 340/905 |
| 2014/0163768 A1 | 6/2014 | Purdy et al. | |
| 2015/0039877 A1* | 2/2015 | Hall | G06F 1/32 713/2 |
| 2015/0166072 A1* | 6/2015 | Powers | B60W 40/06 701/1 |
| 2015/0178572 A1* | 6/2015 | Omer | G08G 1/0112 382/108 |
| 2015/0260614 A1* | 9/2015 | Forslof | G08G 1/0112 702/182 |
| 2016/0091323 A1 | 3/2016 | MacGougan et al. | |
| 2016/0371977 A1* | 12/2016 | Wingate | B60W 50/16 |
| 2017/0176196 A1* | 6/2017 | Powers | G01C 21/3415 |
| 2017/0228031 A1* | 8/2017 | Kramer | G06F 3/017 |

* cited by examiner

METHOD FOR BLACK ICE DETECTION AND PREDICTION

BACKGROUND

Exemplary embodiments of the present invention relate to a method for black ice detection. More particularly, exemplary embodiments of the present invention relate to a method of predicting black ice.

Black Ice is a road hazard condition whereby the road appears wet to the driver, but the road is actually covered in a thin sheet of virtually transparent ice making the pavement appear bare or wet, and in the case of asphalt, black. Given the different expectations a driver has between slipperiness of wet pavement versus ice, drivers oftentimes mistakenly travel over black ice patches at inappropriate speeds resulting in traffic accidents. Thus, the ability to accurately detect and/or predict black ice may allow drivers to adjust their driving speeds or driving behavior to prevent traffic accidents.

Black ice detection systems may employ dedicated sensors in the road communicating with receivers near the road which then send the data to a centralized server and warning infrastructure and/or may only use On Board Dash vehicle data for current measurements, which may be sent to a centralized server infrastructure. Thus, centralized data centers may be used in detecting black ice through an internet connection. Loss of the internet connection may, therefore, disrupt access to centralized data centers during weather that may be associated with black ice conditions. Therefore, black ice detection systems that are dependent on internet connections or communications with back end servers may become inaccessible to drivers during weather conditions in which black ice is likely to occur.

SUMMARY

Exemplary embodiments of the present invention provide a method of black ice detection including receiving image stream data from a mobile device. The mobile device is in a vehicle. At least one of accelerometer data from at least one accelerometer, temperature and humidity data, and on board dash vehicle data is received. A classifier embedded in the mobile device is run to evaluate the received image stream data, and the at least one of the accelerometer data, the temperature and humidity data, and the on board dash vehicle data. It is determined whether black ice is present in the image stream data based on a result generated by the classifier.

According to an exemplary embodiment of the present invention, the method of black ice detection may include receiving weather forecast data.

According to an exemplary embodiment of the present invention, the image stream data may include data regarding whether liquid spray from another vehicle is present, and the classifier may determine whether a liquid spray is present.

According to an exemplary embodiment of the present invention, the method of black ice detection may include determining a size of one or more tires of another vehicle, and quantitatively determining an amount of liquid spray emitted from the one or more tires.

According to an exemplary embodiment of the present invention, the mobile device may be a first mobile device and the vehicle may be a first vehicle. The first mobile device may communicate with a second mobile device in a second vehicle. The first mobile device may receive or transmit data or alerts regarding black ice to or from the second mobile device.

According to an exemplary embodiment of the present invention, the first mobile device may receive at least one of the accelerometer data, the temperature and humidity data, and the on board dash vehicle data from the second mobile device in the second vehicle.

According to an exemplary embodiment of the present invention, the first and second mobile devices may communicate between the first and second vehicles through a direct WiFi connection, Bluetooth connection, Near Field Communication or short range radio communication.

According to an exemplary embodiment of the present invention, the first and second mobile devices may communicate through a mesh network employing multi-hop communication.

According to an exemplary embodiment of the present invention, the temperature and humidity data may be obtained by the mobile device from one or more weather forecast services, or from one or more social media services.

According to an exemplary embodiment of the present invention, the method of black ice detection may include determining whether a formation of black ice is imminent within a predetermined period of time.

According to an exemplary embodiment of the present invention, the method of black ice detection may include receiving feedback from a user of the mobile device. The feedback may include verification of whether a presence of black ice was accurately determined.

According to an exemplary embodiment of the present invention, the mobile device may include at least one of a smart phone, a smart watch, a tablet computing device, smart glasses, and a dash camera.

Exemplary embodiments of the present invention provide a method of black ice detection including receiving image stream data from a camera disposed in a vehicle and receiving at least one of accelerometer data from one or more accelerometers in the vehicle, temperature and humidity data from one or more sensors in the vehicle, and on board dash vehicle data. A classifier embedded in an onboard computer in the vehicle is run to evaluate the received image stream data, and the at least one of the accelerometer data, the temperature and humidity data, and the on board dash vehicle data. It is determined whether black ice is present in the image stream data based on a result generated by the classifier.

According to an exemplary embodiment of the present invention, the method of black ice detection may include receiving weather forecast data.

According to an exemplary embodiment of the present invention, the image stream data may include data regarding whether liquid spray from another vehicle is present, and the classifier may determine whether a liquid spray is present.

According to an exemplary embodiment of the present invention, the method of black ice detection may include determining a size of one or more tires of another vehicle, and quantitatively determining an amount of liquid spray emitted from the one or more tires.

According to an exemplary embodiment of the present invention, the method of black ice detection may include determining whether a formation of black ice is imminent within a predetermined period of time.

Exemplary embodiments of the present invention provide a computer program product for black ice detection, the computer program product including a computer readable storage medium having program instructions embodied therewith, the program instructions executable by a processor to cause the processor to perform the following. Receive image stream data from a mobile device. The mobile device is in a vehicle. Receive at least one of accelerometer data from at least one accelerometer, temperature and humidity data, and on board dash vehicle data. Run a classifier to evaluate the received image stream data, and the at least one of the accelerometer data, the temperature and humidity data, and the on board dash vehicle data. Determine whether black ice is present in the image stream data based on a result generated by the classifier.

According to an exemplary embodiment of the present invention, the program instructions executable by the processor may cause the processor to receive weather forecast data.

According to an exemplary embodiment of the present invention, the image stream data may include data regarding whether or not liquid spray from another vehicle is present, and wherein the classifier determines whether a liquid spray is present.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

It will be understood that the terms "first," "second," "third," etc. are used herein to distinguish one element from another, and the elements are not limited by these terms. Thus, a "first" element in an exemplary embodiment may be described as a "second" element in another exemplary embodiment.

One or more exemplary embodiments of the present invention may employ computer vision or computer aided vision to determine wheel spray, vehicle stopping patterns, and temperature with machine learning algorithms to detect and predict black ice. The phrases computer vision and computer aided vision may be used interchangeably herein.

One or more exemplary embodiments of the present invention provide a method of black ice detection and prediction implemented locally on a mobile device (e.g., a Smartphone). Data may be shared amongst a plurality of mobile devices to detect or predict black ice. For example, data may be shared in the absence of an internet of cellular network connection between local, direct mobile device to mobile device communication. For example, localized networking (e.g. Bluetooth, Near Field Communication) may be used for communication between localized devices without the use of a centralized data center (e.g., a back end server or a cloud based server) for warning generation and data collection.

One or more exemplary embodiments of the present invention may use on-board diagnostics (OBD) data and provide the OBD data to a mobile device to detect axle slippage.

Exemplary embodiments of the present invention will be described more fully hereinafter with reference to the accompanying drawings. Like reference numerals may refer to like elements throughout the specification and drawings.

Figure 1:
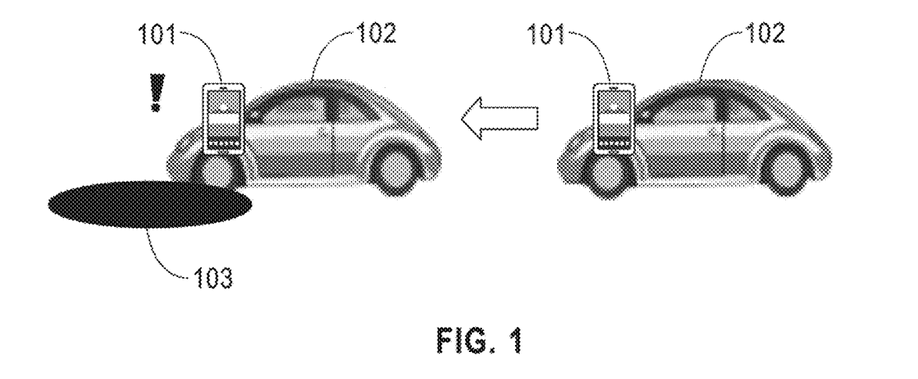
FIG. 1 illustrates a vehicle including a mobile device detecting black ice according to an exemplary embodiment of the present invention.
Figure 2:
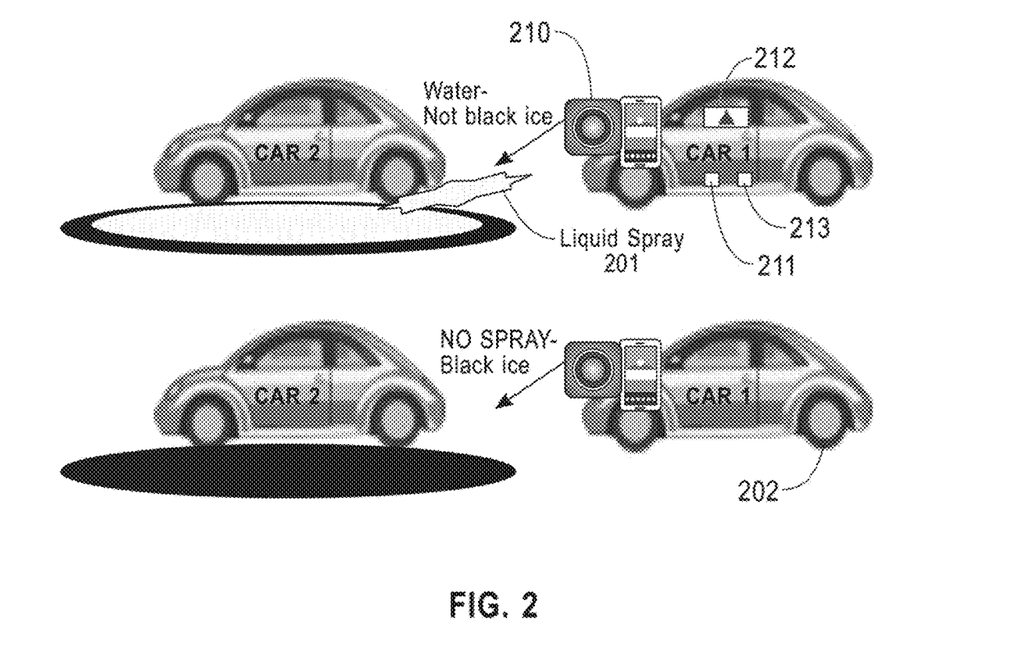
FIG. 2 illustrates a vehicle including a mobile device detecting black ice according to an exemplary embodiment of the present invention.
Figure 3:
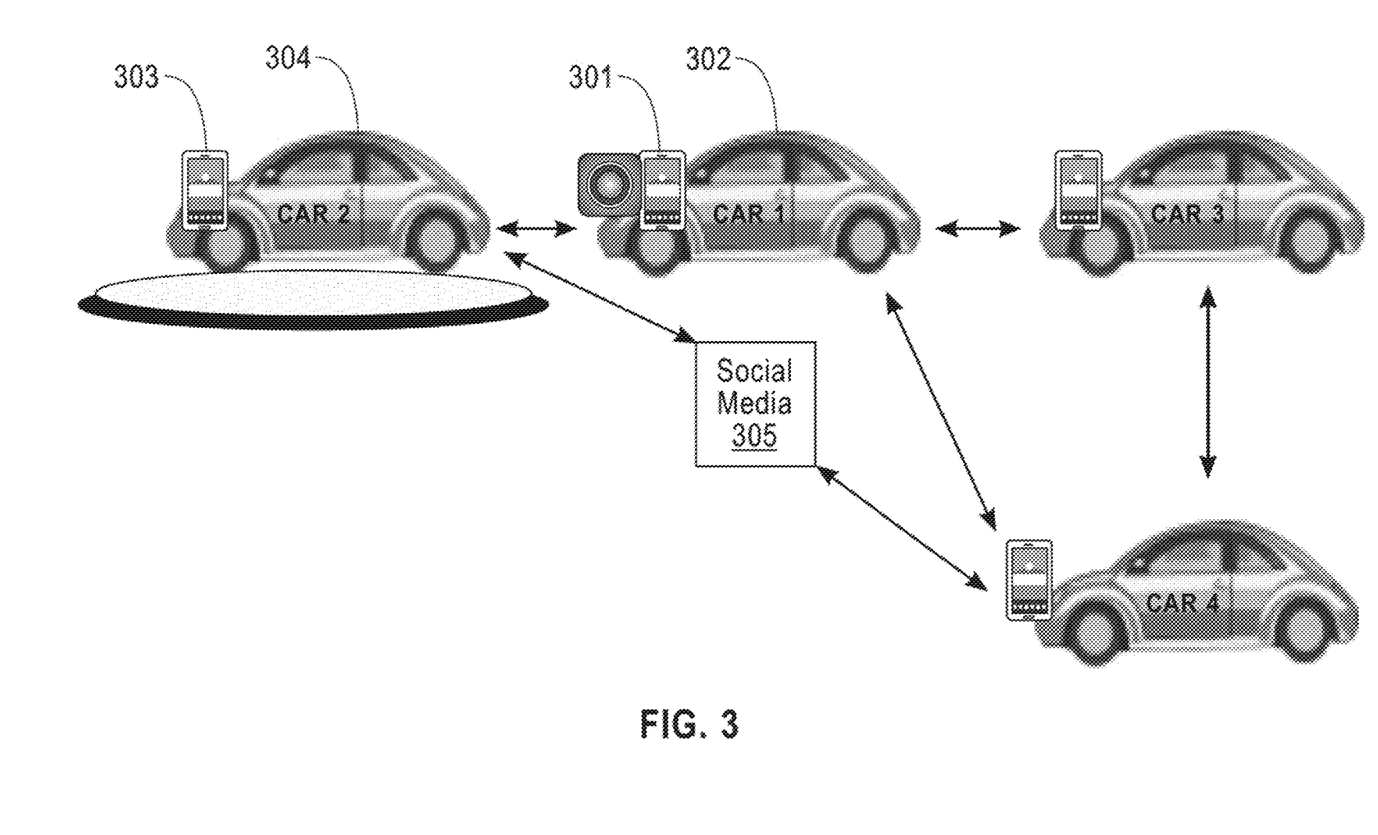
FIG. 3 illustrates a plurality of vehicles detecting and predicting black ice, and communicating black ice alerts and predictions according to an exemplary embodiment of the present invention.
Figure 4:
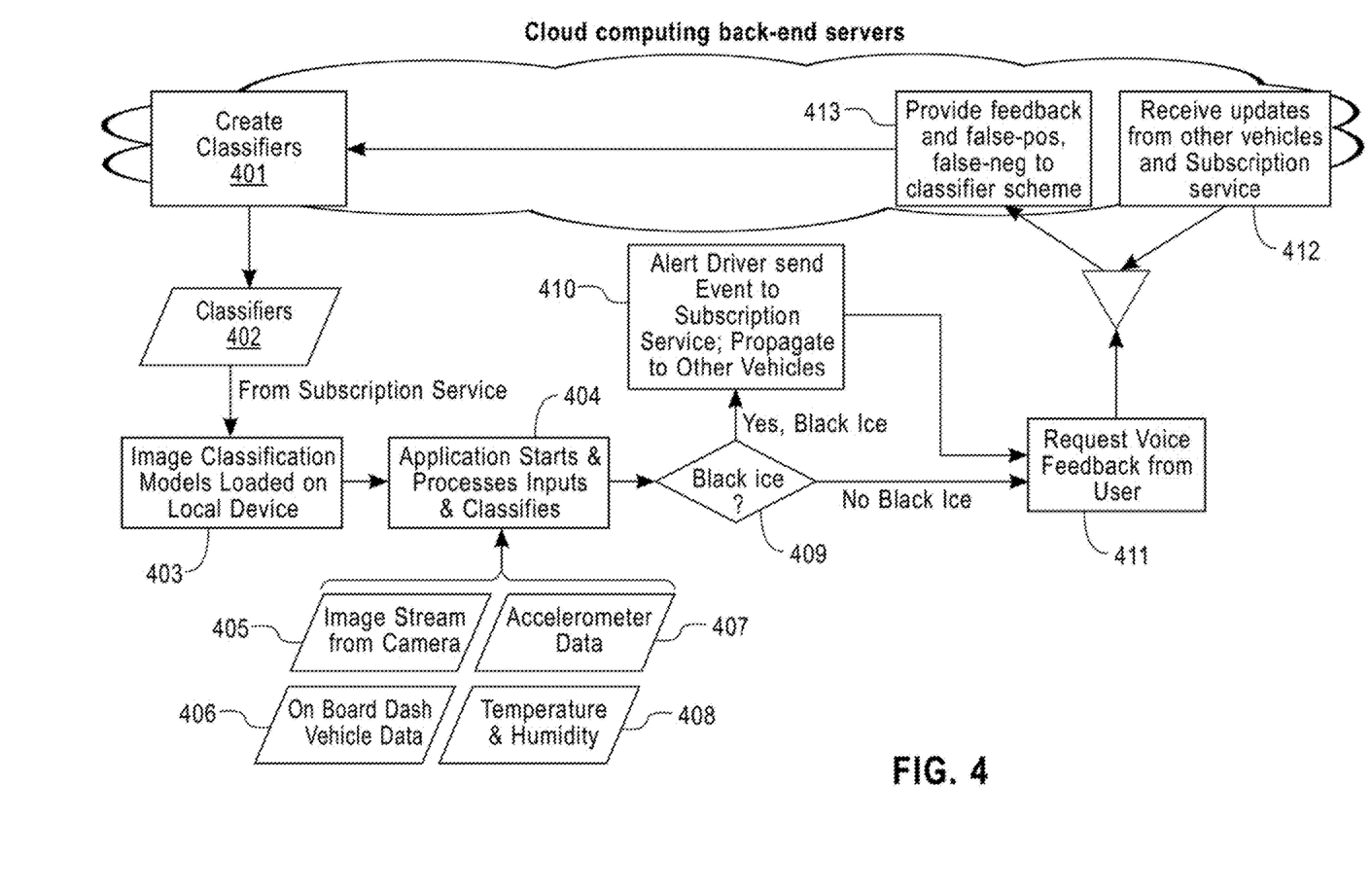
FIG. 4 is a flowchart illustrating a method of detecting and predicting black ice according to an exemplary embodiment of the present invention.
Figure 5:
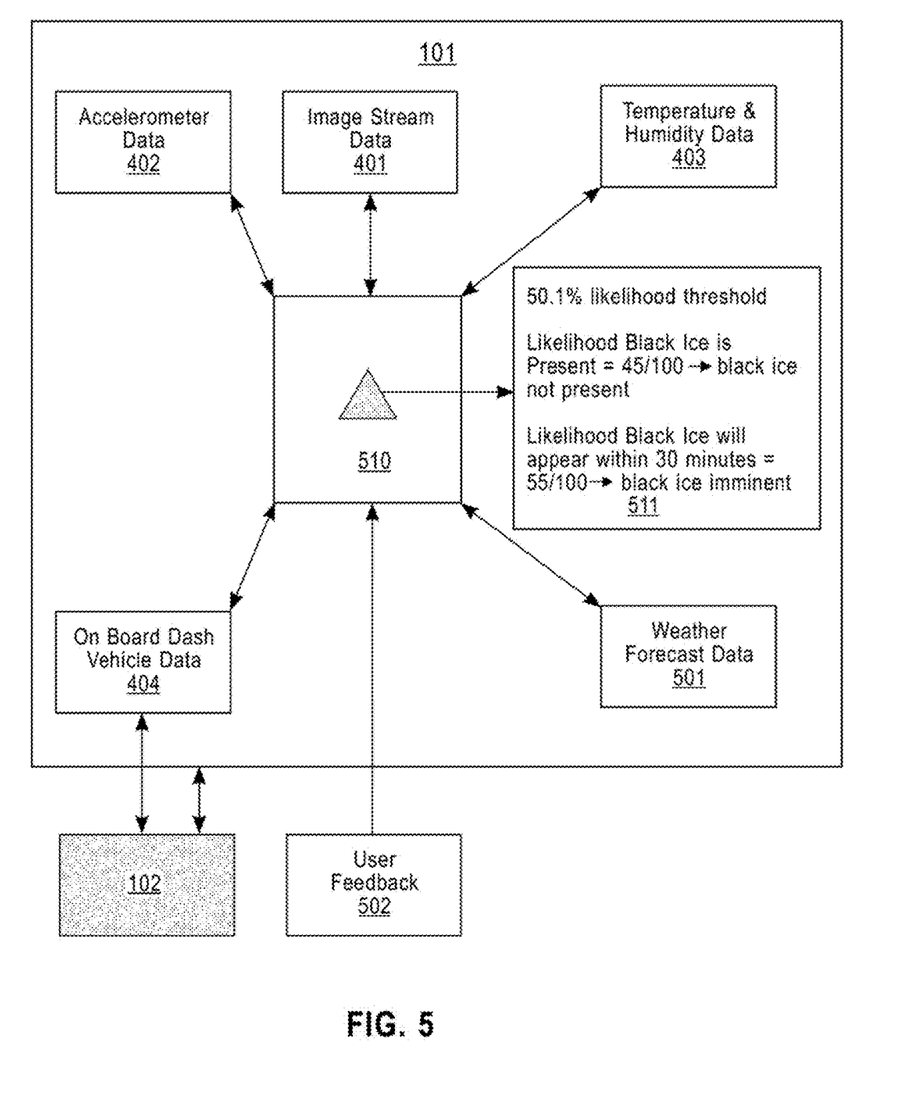
FIG. 5 is a schematic diagram illustrating a method of detecting and predicting black ice according to an exemplary embodiment of the present invention.

FIG. 1 illustrates a vehicle including a mobile device detecting black ice according to an exemplary embodiment of the present invention. FIG. 2 illustrates a vehicle including a mobile device detecting black ice according to an exemplary embodiment of the present invention. FIG. 3 illustrates a plurality of vehicles detecting and predicting black ice, and communicating black ice alerts and predictions according to an exemplary embodiment of the present invention. FIG. 4 is a flowchart illustrating a method of detecting and predicting black ice according to an exemplary embodiment of the present invention. FIG. 5 is a schematic diagram illustrating a method of detecting and predicting black ice according to an exemplary embodiment of the present invention.

Referring to FIGS. 1-5, according to an exemplary embodiment of the present invention, a method of black ice detection includes receiving image stream data 401 from a mobile device 101. The mobile device is in a vehicle 102. At least one of accelerometer data 402 from at least one accelerometer, temperature and humidity data 403, and on board dash vehicle data 404 may be received. A classifier 510 embedded in the mobile device 101 may be run to evaluate the received image stream data, and the at least one of the accelerometer data, the temperature and humidity data, and the on board dash vehicle data. It is determined whether black ice is present in the image stream data based on a result 511 generated by the classifier 510.

Receiving image stream data 401 at the mobile device 101 and parsing the image stream data 401 by the classifier 510 may be referred to as computer vision or computer aided vision, which may be used to determine wheel spray, vehicle stopping patterns, and temperature with machine learning algorithms to detect and predict black ice, as discussed below in more detail. The phrases computer vision and computer aided vision may be used interchangeably herein.

According to an exemplary embodiment of the present invention, the method of black ice detection may include receiving weather forecast data 501. The weather forecast data 501 may be received from one or more weather forecasting services, and a most recent weather forecast data report may be stored on the mobile device 101 for use by the classifier 510 at a later time (e.g., when an internet connection or cell tower connection is not available).

According to an exemplary embodiment of the present invention, the image stream data may include data regarding whether liquid spray 201 from another vehicle (e.g., a second vehicle 304) is present, and the classifier 510 may determine whether a liquid spray is present.

According to an exemplary embodiment of the present invention, the method of black ice detection may include determining a size of one or more tires 202 of another vehicle, and quantitatively determining an amount of liquid spray emitted from the one or more tires 202. Black ice may be detected by whether one or more tires 202 from another vehicle is producing spray (e.g., from the back tires). Spray may be an indication that liquid water is present, and thus that at least some of the water on the roadway is not frozen. When no spray near the surface of a roadway is detected on a roadway that appears wet (e.g., shiny) it may indicate that black ice is present. The amount of spray expected from a tire can further be modeled based on statistical learning from tire width and vehicle speed. This can all be incorporated into one or more of the algorithms executed by the classifier 510, and discussed below in more detail.

According to exemplary embodiments of the present invention, the classifier 510 may execute one or more algorithms to detect or predict black ice. For example, as discussed below in more detail, one or more algorithms may be executed to determine a presence and/or amount of liquid spray from a vehicle's tires. Exemplary embodiments of the present invention may employ one or more statistical and machine learning algorithms for computing at the edge. For machine vision this may include Haar Classifiers for volume and shape determination of spray clouds, while for classification involving feature sets of other modalities (e.g. image and inertial measurement units) k-means clustering, Principle Component Analysis (PCA), support vector machines (SVM) and even deep neural network (DNN) training and classification may be employed. As an example, the classifiers in a commercially available software such as IBM Multimedia Analysis and Retrieval System (IMARS) are adopted and ported to a mobile device in a vehicle.

Referring to FIG. 5, a threshold value may be set for the presence of black ice or for a prediction that black ice will likely occur within a predetermined time period. For example, the threshold may be set at a 50% likelihood. Thus, if the classifier determines that there is greater than a 50% chance that black ice is present in the image stream data 401, then it may determine that black ice is detected. Additionally, if the classifier determines that there is greater than a 50% chance that black ice will form within a predetermined time period, then it may determine that black ice is imminent.

The mobile device 101 may employ historical data (e.g., weather forecast data which was captured and stored in the mobile device 101 prior to a loss of an internet of cell tower connection) for temperature and humidity data 403 and/or for weather forecast data 501. The mobile device 101 may receive data (e.g., temperature and humidity data 403) from the vehicle 102, such as through sensors (e.g., sensors 211) disposed in the vehicle 102 or from an on board vehicle computer. The mobile device 101 may receive data (e.g., temperature and humidity data 403) from one or more other sensors associated with the mobile device 101 for directly measuring data points such as temperature and humidity. Thus, data (e.g., temperature and humidity data 403) may be directly captured by the mobile device 101 from a variety of sources without the use of an internet connection, cell tower connection, or other network connection.

The temperature data may include a determination of whether the temperature is below a critical temperature threshold. For example, a critical temperature threshold may be 37° F. That is, below 37° F. it may become possible for black ice to form on roadways. The critical temperature threshold may be adjusted based on a humidity level.

According to an exemplary embodiment of the present invention, the mobile device may be mounted on or near the dash board of the vehicle, similar to how a GPS unit may be mounted. In this example the camera from the mounted mobile phone device is may be used to capture and/or record the image stream data 401. However, exemplary embodiments of the present invention are not limited to use of the mobile device 101. For example, mounted dash camera(s) may capture and/or record the image stream data 401 and may be integrated into the vehicles on board computer.

According to an exemplary embodiment of the present invention, the mobile device may be a first mobile device 301 and the vehicle may be a first vehicle 302. The first mobile device 301 may communicate with a second mobile device 303 in a second vehicle 304. The first mobile device 301 may receive or transmit data or alerts regarding black ice to or from the second mobile device 303.

According to an exemplary embodiment of the present invention, the alerts regarding black ice may be used to change a route of a vehicle to avoid black ice. For example, if a user of a second vehicle 304 receives an alert that black ice has been detected or predicted on a road ahead from a user of a first vehicle 302, the user of the second vehicle 304 may select a different driving route (e.g., a route in which black ice has not been detected).

According to an exemplary embodiment of the present invention, the alerts regarding black ice may be used to coordinate municipal services. For example, salt trucks may be deployed to areas in which black ice is detected or predicted.

Referring to FIG. 3, for example, black ice events can be propagated to nearby vehicles via WiFi Direct (connected cars) or to vehicles that may be a further distance through auto-generated notification (hands free) on social media (e.g. Twitter). Similarly, vehicles can subscribe to social media event streams (e.g. Twitter or a weather channel hashtag) that can relay black ice events in their area.

According to an exemplary embodiment of the present invention data on current conditions (e.g., alerts and warnings regarding a particular roadway) as well as predictive alerts may be sent to mobile devices in vehicles which are in the same proximity as the mobile device 101. This data may be further propagated to other devices further away using mulit-hop communication techniques or connecting to available wireless infrastructure.

According to an exemplary embodiment of the present invention, the data on current conditions (e.g., alerts and warnings regarding a particular roadway) may be used to integrate generated warnings received on mobile device or generated by a mobile device to existing community sourced traffic warning and route planning systems such as WAZE®, which may be used to adjust travel plans and push important safety information to networks of users.

According to an exemplary embodiment of the present invention, the first mobile device may 301 receive at least one of the accelerometer data, the temperature and humidity data, and the on board dash vehicle data from the second mobile device 303 in the second vehicle 304.

According to an exemplary embodiment of the present invention, the first and second mobile devices 301 and 303 may communicate between the first and second vehicles 302 and 304 through a direct WiFi connection, Bluetooth connection, Near Field Communication or short range radio communication.

According to an exemplary embodiment of the present invention, the first and second mobile devices 301 and 303 may communicate through a mesh network employing multi-hop Peer-to-Peer communication (see, e.g., FIG. 3).

According to an exemplary embodiment of the present invention, the temperature and humidity data may be obtained by the mobile device 101 from one or more weather forecast services, or from one or more social media services 305.

According to an exemplary embodiment of the present invention, the method of black ice detection may include determining whether a formation of black ice is imminent within a predetermined period of time. For example, the predetermined period of time may be 30 minutes; however, exemplary embodiments of the present invention are not limited thereto, and the predetermined time period may be any desired period of time.

According to an exemplary embodiment of the present invention, the method of black ice detection may include receiving feedback 502 from a user of the mobile device. The feedback may include verification of whether a presence of black ice was accurately determined.

According to an exemplary embodiment of the present invention, the mobile device may include at least one of a smart phone, a smart watch, a tablet computing device, smart glasses, and a dash camera.

Referring to FIG. 4, according to one or more exemplary embodiments of the present invention, a classifier 402 may be run locally, without communication with a back end server, a cloud based server. That is, the classifier may be trained (created) 401 at a prior time for a detection or prediction of black ice, and image classification models may be loaded onto a local device 403. Thus, the classifier 402 may be stored locally on the mobile device (e.g., the mobile device 101). The classifier 402 may be trained by communicating with a back end server or a cloud based server; however the classifier 402 may run without access to the back end server or the cloud based server. That is, the classifier 402 according to exemplary embodiments of the present invention may run without access to an internet connection and/or without access to a cellular network. The classifier 402 described with reference to FIG. 4 may be substantially the same as the classifier 510 described with reference to FIGS. 5 and 6.

An application running the classifier 402 may start and process inputs and classify the inputs 404. The inputs may include image stream data 405, on board vehicle data 406, accelerometer data 407 and/or temperature and humidity data 408. A determination may be made whether black ice is detected 409. If black ice is detected, the application may alert driver and send the detected event to a subscription service and propagate the event to other vehicles 410. If black ice is not detected, or after propagating the event to other drivers, the application may request voice feedback from a user 411. The feedback may include a request regarding whether black ice was accurately detected. Updates may be received from other vehicles 412. The feedback may be communicated directly between mobile devices, as described herein, or may be communicated through the back end server. The back end server may evaluate feedback and false positives and false negatives and incorporate that information into the classifier's scheme 413.

Thus, the classifier may be updated and the functionality of the classifier may be improved. This process is an exemplar of machine learning.

Figure 6:
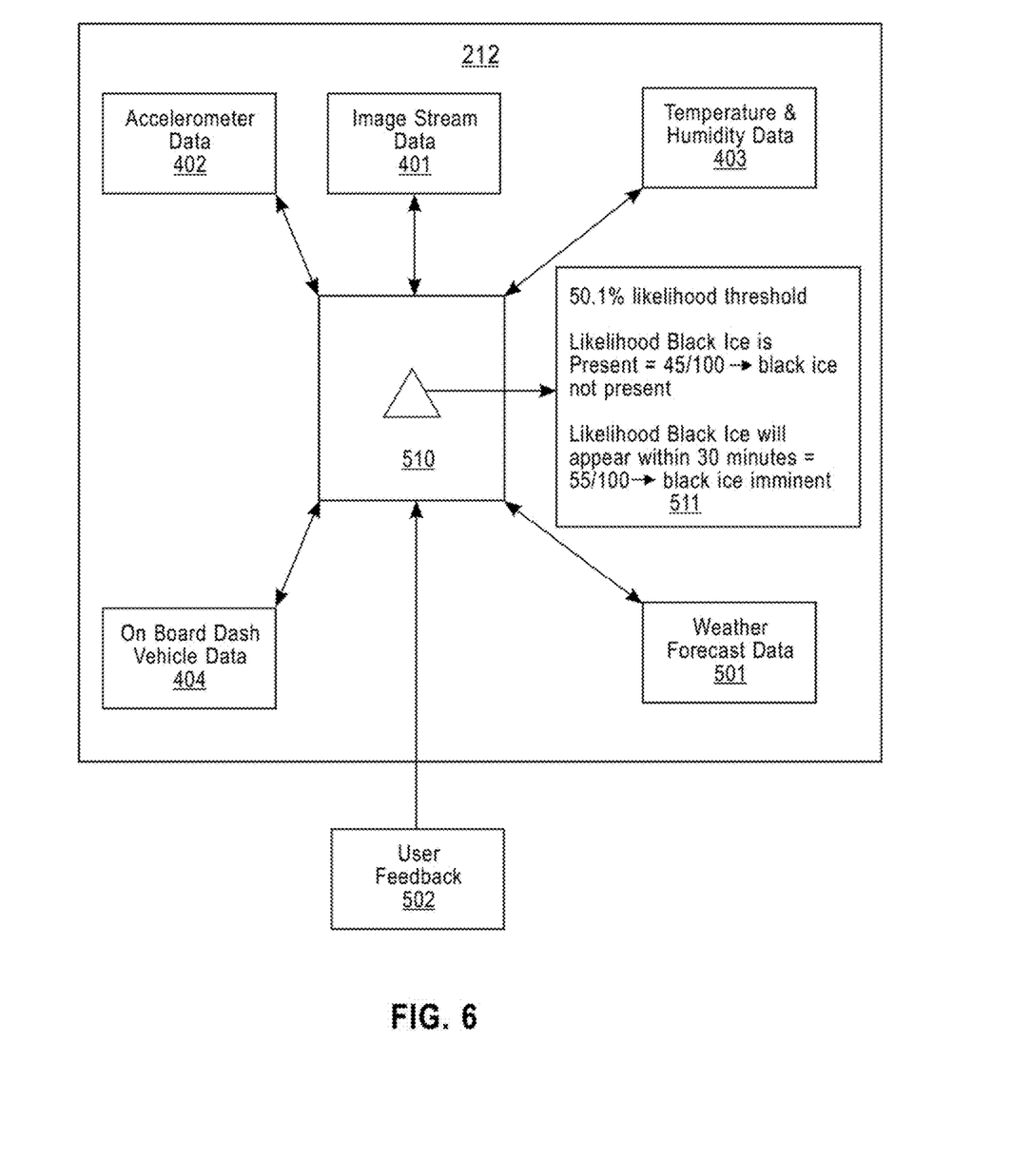
FIG. 6 is a schematic diagram illustrating a method of detecting and predicting black ice according to an exemplary embodiment of the present invention.

FIG. 6 is a schematic diagram illustrating a method of detecting and predicting black ice according to an exemplary embodiment of the present invention.

Referring to FIG. 6, according to an exemplary embodiment of the present invention, a method of black ice detection includes receiving image stream data 401 from a camera 210 disposed in a vehicle (e.g., vehicle 102) and receiving at least one of accelerometer data 402 from one or more accelerometers 213 in the vehicle, temperature and humidity data 403 from one or more sensors 211 in the vehicle, and on board dash vehicle data 404. A classifier 510 embedded in an onboard computer 212 in the vehicle is run to evaluate the received image stream data, and the at least one of the accelerometer data, the temperature and humidity data, and the on board dash vehicle data. It is determined whether black ice is present in the image stream data based on a result 511 generated by the classifier 510. The method described with reference to FIG. 6 may be substantially the same as the method described with reference to FIGS. 1-5, except that the method described with reference to FIG. 6 may include a classifier 510 embedded in an onboard computer 212 in a vehicle. Thus, the mobile device 101 may be omitted in the method described with reference to FIG. 6.

According to an exemplary embodiment of the present invention, the method of black ice detection may include receiving weather forecast data 501.

According to an exemplary embodiment of the present invention, the image stream data may include data regarding whether liquid spray 201 from another vehicle (e.g., a second vehicle 304) is present, and the classifier 510 may determine whether a liquid spray is present.

According to an exemplary embodiment of the present invention, the method of black ice detection may include determining a size of one or more tires 202 of another vehicle, and quantitatively determining an amount of liquid spray emitted from the one or more tires 202. Black ice may be detected by whether one or more tires 202 from another vehicle is producing spray (e.g., from the back tires). Spray may be an indication that liquid water is present, and thus that at least some of the water on the roadway is not frozen. When no spray near the surface of a roadway is detected on a roadway that appears wet (e.g., shiny) it may indicate that black ice is present. The amount of spray expected from a tire can further be modeled based on statistical learning from tire width and vehicle speed. This can all be incorporated into one or more of the algorithms executed by the classifier 510, and discussed below in more detail.

According to exemplary embodiments of the present invention, the classifier 510 may execute one or more algorithms to detect or predict black ice. For example, as discussed below in more detail, one or more algorithms may be executed to determine a presence and/or amount of liquid spray from a vehicle's tires. Exemplary embodiments of the present invention may employ one or more statistical and machine learning algorithms for computing at the edge. For machine vision this may include Haar Classifiers for volume and shape determination of spray clouds, while for classification involving feature sets of other modalities (e.g. image and inertial measurement units) k-means clustering, Principle Component Analysis (PCA), support vector machines (SVM) and even deep neural network (DNN) training and classification may be employed.

According to an exemplary embodiment of the present invention, the method of black ice detection may include determining a size of one or more tires 202 of another vehicle, and quantitatively determining an amount of liquid spray emitted from the one or more tires 202.

According to an exemplary embodiment of the present invention, the method of black ice detection may include determining whether a formation of black ice is imminent within a predetermined period of time. For example, the predetermined period of time may be 30 minutes; however, exemplary embodiments of the present invention are not limited thereto, and the predetermined time period may be any desired period of time.

Figure 7:
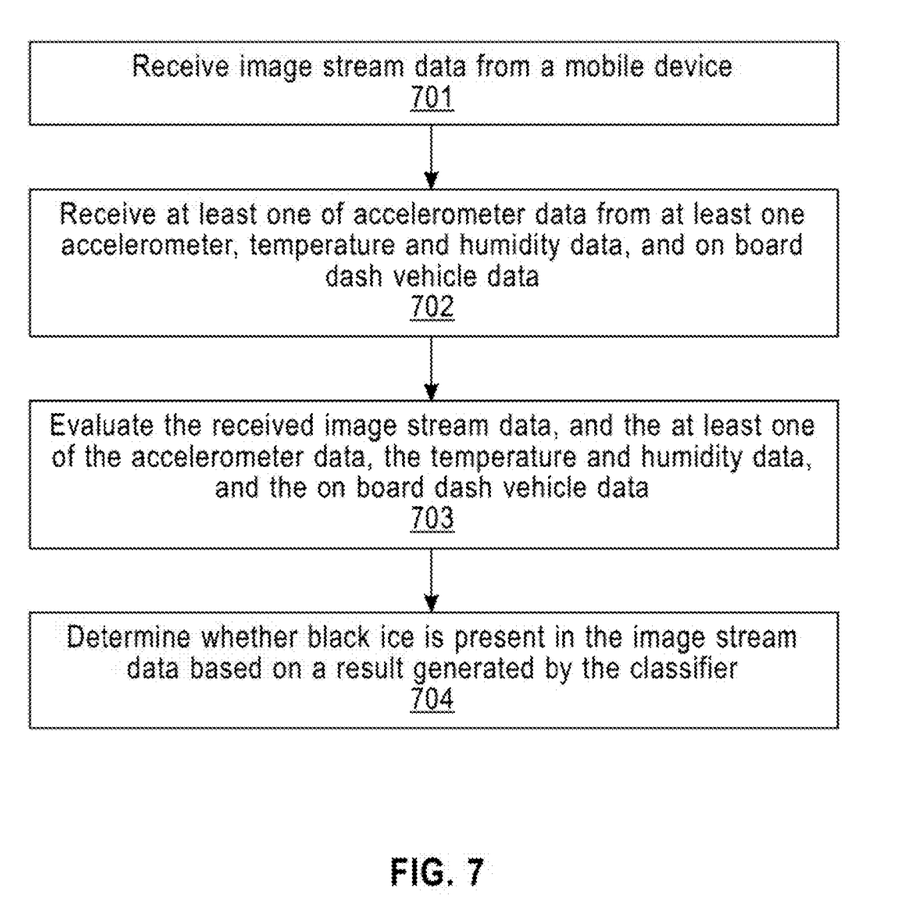
FIG. 7 is a flowchart illustrating a method of detecting and predicting black ice according to an exemplary embodiment of the present invention.

FIG. 7 is a flowchart illustrating a method of detecting and predicting black ice according to an exemplary embodiment of the present invention.

Referring to FIG. 7, according to an exemplary embodiment of the present invention, a method of black ice detection includes receiving image stream data from a mobile device 701. The mobile device is in a vehicle. At least one of accelerometer data from at least one accelerometer, temperature and humidity data, and on board dash vehicle data is received 702. A classifier embedded in the mobile device is run to evaluate the received image stream data, and the at least one of the accelerometer data, the temperature and humidity data, and the on board dash vehicle data 703. It is determined whether black ice is present in the image stream data based on a result generated by the classifier 704.

Figure 8:
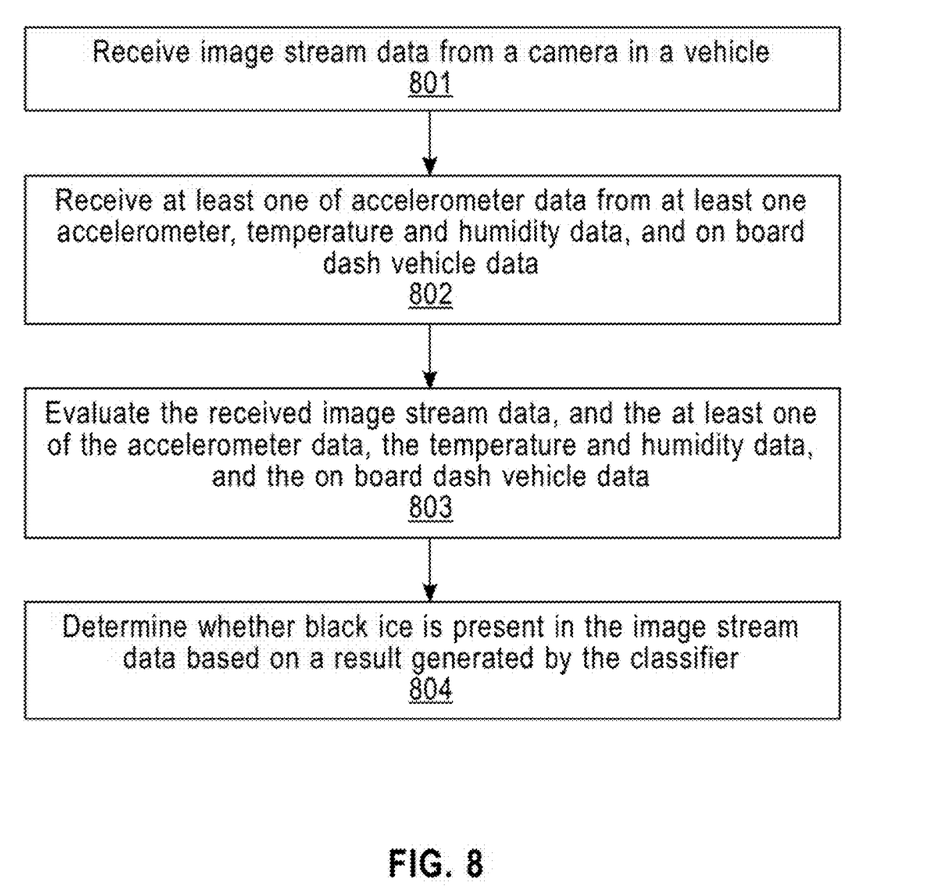
FIG. 8 is a flowchart illustrating a method of detecting and predicting black ice according to an exemplary embodiment of the present invention.

FIG. 8 is a flowchart illustrating a method of detecting and predicting black ice according to an exemplary embodiment of the present invention.

Referring to FIG. 8, according to an exemplary embodiment of the present invention, a method of black ice detection includes receiving image stream data from a camera disposed in a vehicle 801. At least one of accelerometer data from one or more accelerometers in the vehicle, temperature and humidity data from one or more sensors in the vehicle, and on board dash vehicle data is received 802. A classifier embedded in an onboard computer in the vehicle is run to evaluate the received image stream data, and the at least one of the accelerometer data, the temperature and humidity data, and the on board dash vehicle data 803. It is determined whether black ice is present in the image stream data based on a result generated by the classifier 804.

Figure 9:
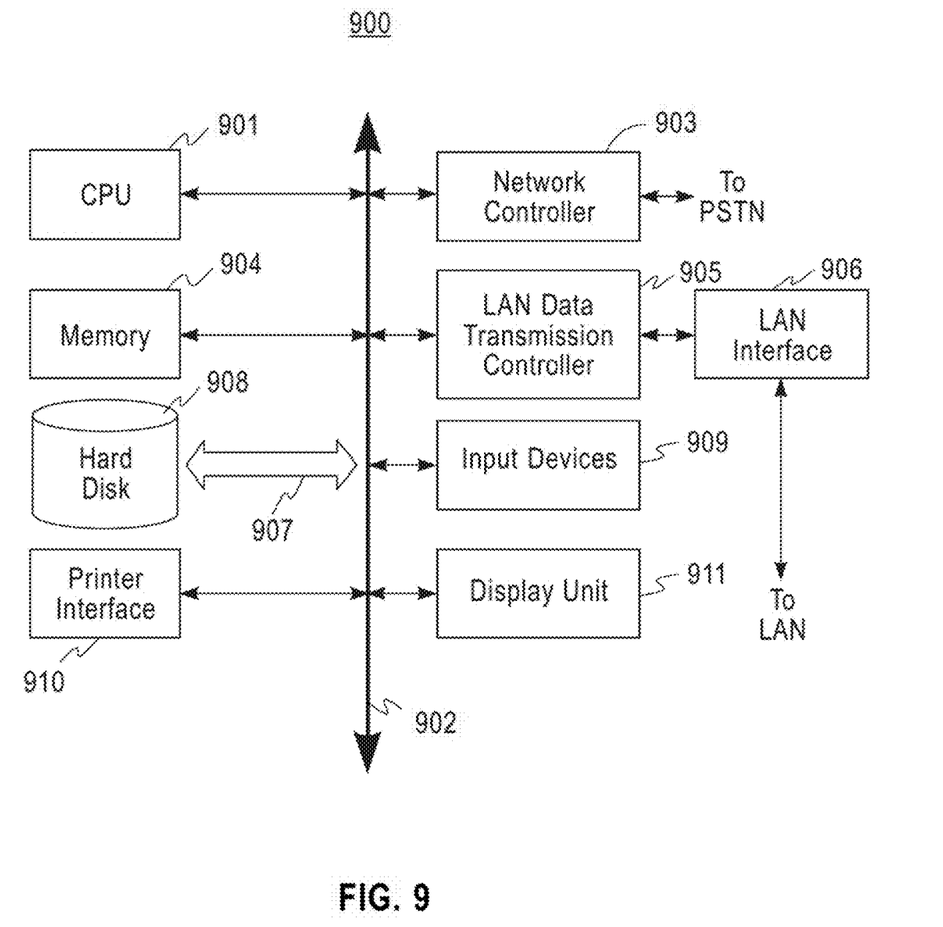
FIG. 9 illustrates an example of a computer system capable of implementing the methods according to exemplary embodiments of the present invention.

FIG. 9 illustrates an example of a computer system capable of implementing the methods according to exemplary embodiments of the present invention.

FIG. 9 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 900 may include, for example, a central processing unit (CPU) 901, random access memory (RAM) 904, a printer interface 910, a display unit 911, a local area network (LAN) data transmission controller 905, a LAN interface 906, a network controller 903, an internal bus 902, and one or more input devices 909, for example, a keyboard, mouse etc. As shown, the system 900 may be connected to a data storage device, for example, a hard disk, 908 via a link 907.

An exemplary embodiment of the present invention provides a computer program product for black ice detection, the computer program product including a computer readable storage medium having program instructions embodied therewith, the program instructions executable by a processor (e.g., CPU 901) to cause the processor (e.g., CPU 901) to perform the following. Receive image stream data from a mobile device. The mobile device is in a vehicle. Receive at least one of accelerometer data from at least one accelerometer, temperature and humidity data, and on board dash vehicle data. Run a classifier to evaluate the received image stream data, and the at least one of the accelerometer data, the temperature and humidity data, and the on board dash vehicle data. Determine whether black ice is present in the image stream data based on a result generated by the classifier.

According to an exemplary embodiment of the present invention, the program instructions executable by the processor (e.g., CPU 901) may cause the processor to receive weather forecast data.

According to an exemplary embodiment of the present invention, the image stream data may include data regarding whether or not liquid spray from another vehicle is present, and wherein the classifier determines whether a liquid spray is present.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and/or block diagrams in the figures illustrate the architecture, functionality, and operation of possible implementations of systems, methods, and computer program products according to various exemplary embodiments of the invention. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Scenarios

The weather is such that there is a mix of precipitation and external temperature is close to the freezing point. Multiple drivers have an application including the classifier according to exemplary embodiments of the present invention loaded on their mobile devices. The drivers are traveling in a particular area (e.g., several hundred square yards). The mobile devices are mounted much as GPS devices are mounted on or near a dash of the drivers' vehicles. The mounting of the mobile devices similar to a GPS device may stabilize the accelerometer and GPS data collected on the phone.

The mobile device in particular driver's car has an OBD sensor connected to the driver's vehicle. By using the application including the classifier according to exemplary embodiments of the present invention the driver compares brake forces and axle forces to calculate slipping factors. When the driver hits a patch of black ice, a black ice alert is triggered and an alert with his location, time, and black ice warning is transmitted over various network interfaces for all secure subscribers to receive. The black ice event is also posted to WAZE®.

The mobile device in particular driver's car does not have an OBD sensor, but does include the application including the classifier according to exemplary embodiments of the present invention. The application is using one or more of the algorithms according to exemplary embodiments of the present invention to monitor the wheel spray and stopping pattern of the cars in front of the driver. The broader the wheel spray the more water content on the road surface. If the surface is shiny and wheel spray diminishes, along with temperature, there is a likelihood that black ice is forming. That in combination with the stopping pattern feature recognition of the machine learning model on the driver's mobile device and the temperature data generate a probability that black ice has formed or is forming and an alert is created. The mobile device alerts the driver and also sends the alert through multiple networking interfaces to secure subscribers to the app and WAZE® about the potential of black ice.

A mobile device in a car of a second user (e.g., driver) that has received alerts from other devices in other users' cars via a multi-hop mechanism. The second user is still several miles away from the black ice incidents so the application according to exemplary embodiments of the present invention processes the events and integrates with existing weather prediction data from other applications or websites to determine the likelihood that the black ice conditions will continue or get worse. A recommendation is then generated for the second user to find alternate routes. Alternate routes may be suggested.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A method of black ice detection, comprising:
   receiving image stream data from a mobile device, wherein the mobile device is in a vehicle;
   receiving at least one of accelerometer data from at least one accelerometer, temperature and humidity data, and on board dash vehicle data;
   running a classifier embedded in the mobile device to evaluate the received image stream data, and the at least one of the accelerometer data, the temperature and humidity data, and the on board dash vehicle data, wherein the image stream data includes data regarding whether liquid spray from another vehicle is present, and wherein the classifier determines whether a liquid spray is emitted from another vehicle; and
   determining whether black ice is present in the image stream data based on a result generated by the classifier.

2. The method of black ice detection of claim 1, further comprising receiving weather forecast data.

3. The method of black ice detection of claim 1, further comprising determining a size of one or more tires of another vehicle, and quantitatively determining an amount of liquid spray emitted from the one or more tires.

4. The method of black ice detection of claim 1, wherein the mobile device is a first mobile device and the vehicle is a first vehicle, wherein the first mobile device communicates with a second mobile device in a second vehicle, and wherein the first mobile device receives or transmits data or alerts regarding black ice to or from the second mobile device.

5. The method of black ice detection of claim 4, wherein the first mobile device receives at least one of the accelerometer data, the temperature and humidity data, and the on board dash vehicle data from the second mobile device in the second vehicle.

6. The method of black ice detection of claim 5, wherein the first and second mobile devices communicate between the first and second vehicles through a direct WiFi connection, Bluetooth connection, Near Field Communication or short range radio communication.

7. The method of black ice detection of claim 6, wherein the first and second mobile devices communicate through a mesh network employing multi-hop Peer-to-Peer communication.

8. The method of black ice detection of claim 1, wherein the temperature and humidity data are obtained by the mobile device from one or more weather forecast services, or from one or more social media services.

9. The method of black ice detection of claim 1, further comprising determining whether a formation of black ice is imminent within a predetermined period of time.

10. The method of black ice detection of claim 1, further comprising receiving feedback from a user of the mobile device, wherein the feedback comprises verification of whether a presence of black ice was accurately determined.

11. The method of black ice detection of claim 1, wherein the mobile device includes at least one of a smart phone, a smart watch, a tablet computing device, smart glasses, and a dash camera.

12. A method of black ice detection, comprising:
    receiving image stream data from a camera disposed in a vehicle;
    receiving at least one of accelerometer data from one or more accelerometers in the vehicle, temperature and humidity data from one or more sensors in the vehicle, and on board dash vehicle data;
    running a classifier embedded in an onboard computer in the vehicle to evaluate the received image stream data, and the at least one of the accelerometer data, the temperature and humidity data, and the on board dash vehicle data, wherein the image stream data includes data regarding whether liquid spray from another vehicle is present, and wherein the classifier determines whether a liquid spray is emitted from another vehicle; and
    determining whether black ice is present in the image stream data based on a result generated by the classifier.

13. The method of black ice detection of claim 12, further comprising receiving weather forecast data.

14. The method of black ice detection of claim 12, wherein the image stream data includes data regarding whether liquid spray from another vehicle is present, and wherein the classifier determines whether a liquid spray is present.

15. The method of black ice detection of claim 14, further comprising determining a size of one or more tires of another vehicle, and quantitatively determining an amount of liquid spray emitted from the one or more tires.

16. The method of black ice detection of claim 12, further comprising determining whether a formation of black ice is imminent within a predetermined period of time.

17. A computer program product for black ice detection, the computer program product comprising a computer readable storage medium having program instructions embodied therewith, the program instructions executable by a processor to cause the processor to:
    receive by the processor image stream data from a mobile device, wherein the mobile device is in a vehicle;
    receive, by the pr or, at least one of accelerometer data from at least one accelerometer, temperature and humidity data, and on board dash vehicle data;
    run, by the processor, a classifier to evaluate the received image stream data, and the at least one of the accelerometer data, the temperature and humidity data, and the on board dash vehicle data, wherein the image stream data includes data regarding whether liquid spray from another vehicle is present, and wherein the classifier determines whether a liquid spray is emitted from another vehicle; and
    determine, by the processor, whether black ice is present in the image stream data based on a result generated by the classifier.

18. The computer program product for black ice detection of claim 17, wherein the program instructions executable by the processor further cause the processor to receive weather forecast data.

\* \* \* \* \*